Nov. 20, 1973   R. D. TRELEASE ET AL   3,773,962
METHOD OF PREPARING COOKED AND FROZEN LOBSTER PRODUCTS
Filed Oct. 1, 1971   2 Sheets-Sheet 1

INVENTORS
RICHARD D. TRELEASE
SIDNEY MALINOW
JOHN BARANAUSKAS
E T McCabe
ATTORNEY

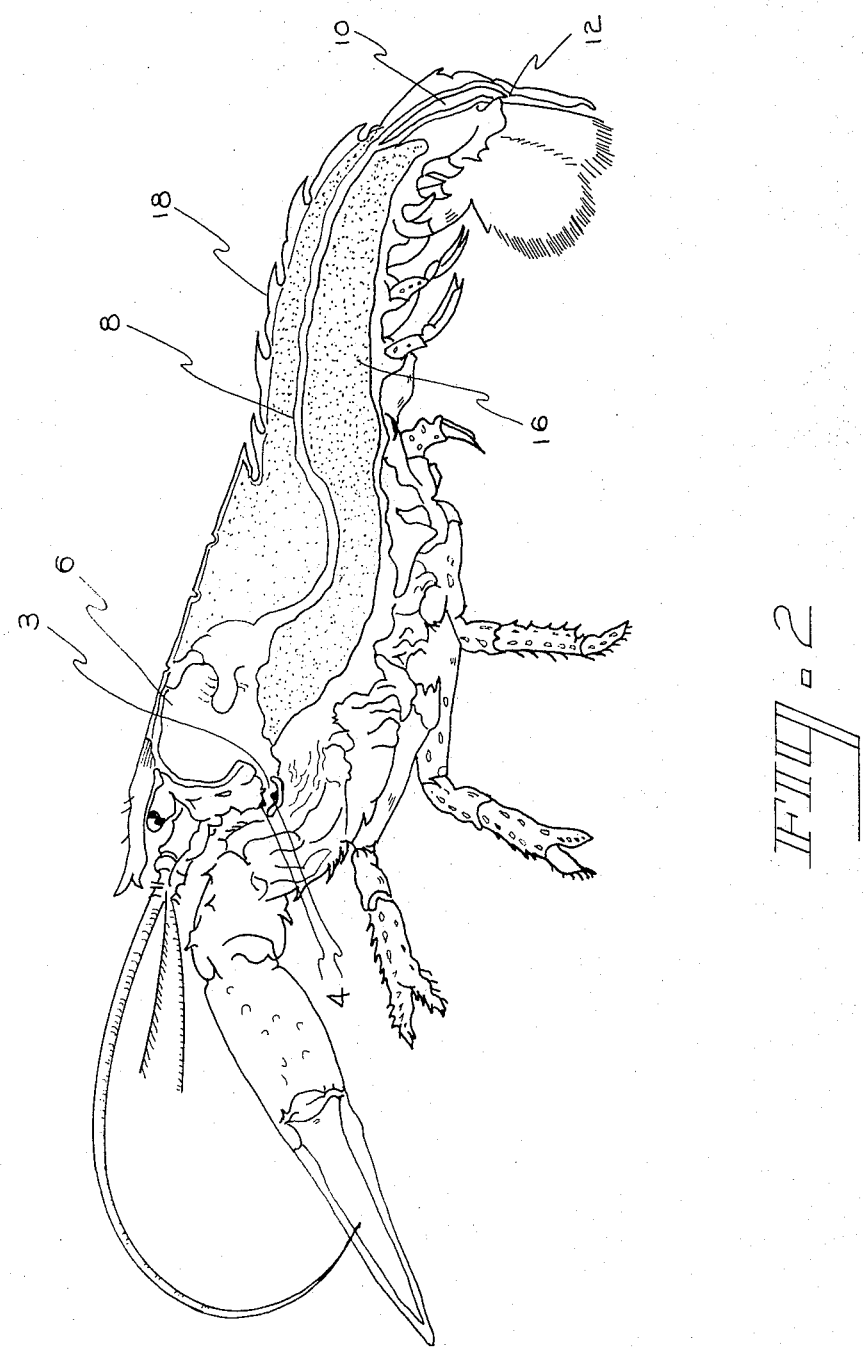

United States Patent Office 3,773,962
Patented Nov. 20, 1973

3,773,962
METHOD OF PREPARING COOKED AND FROZEN LOBSTER PRODUCTS
Richard D. Trelease, Downers Grove, and Sidney Malinow and John Baranauskas, Oak Lawn, Ill., assignors to Swift & Company, Chicago, Ill.
Filed Oct. 1, 1971, Ser. No. 185,636
Int. Cl. A23l 1/33
U.S. Cl. 426—479          9 Claims

ABSTRACT OF THE DISCLOSURE

A frozen and cooked whole lobster product having a long shelf life, prepared by eviscerating a whole lobster and then carrying out a novel two-step cooking sequence which results in a whole, cooked lobster which may be kept frozen over an extended period of time without loss of flavor, texture and color.

Figure 1:
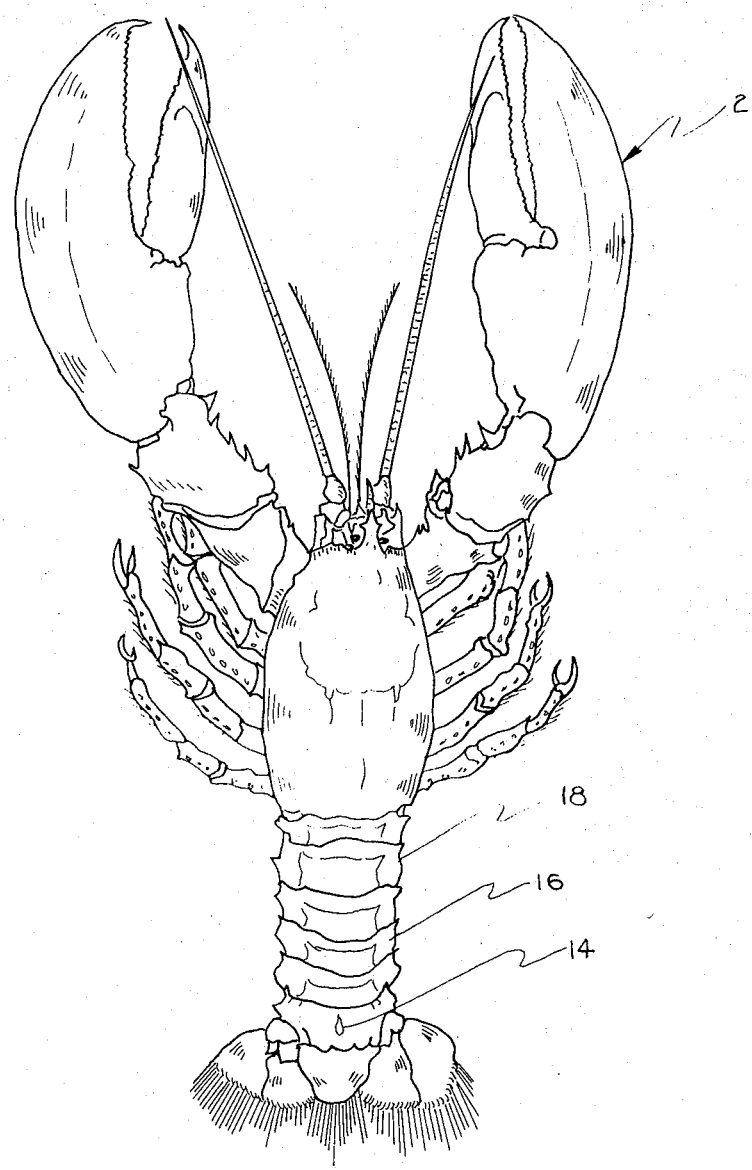

This invention relates to a new and improved method of preparing whole cooked lobsters to be kept frozen for extended storage periods.

Lobsters are generally cooked alive in order to maximize their flavor and tenderness. Therefore, great expense is incurred in attempting to keep lobsters alive in the proper environment and in transporting them alive. Heretofore, no methods have been found to successfully store whole lobsters after they have been killed. The result is that lobsters are relatively expensive and unavailable in many places. Attempts have been made to quick freeze uncooked lobsters, but these attempts have not been successful due to the fact that the meat tends to adhere to the outer skin or shell of the lobster so that it cannot be easily removed without shredding. Also, under such quick freeze treatment, the lobster loses its flavor and the meat loses its firm texture. Some success has been obtained in freezing lobster tails which are generally imported from South Africa. However, the Maine lobster, which is generally procured from the northeastern coast of the United States, is usually eaten whole since there is good meat in the claws, and since the lobster's coral and tomalley are also eaten.

Attempts have also been made to preserve whole lobsters by cooking the lobster and then freezing. These attempts, however, have not been successful inasmuch as the lobsters lose their flavor, the meat becomes tasteless and tough after cooking and off-flavors develop. Some of the problems encountered in preparing a cooked and frozen whole lobster product include: the development of undesirable flavor and odor during storage, blackening and liquefication of the coral (roe), development of an off-color in the lobster meat, loss of desirable pigmentation from the meat surface, and eventual development of rancidity. Also, when the lobster is prepared by cooking in boiling water, the meat develops a tough, dry texture during subsequent storage and reheating. Moreover, when the lobster is cooked in a dry heat, such as broiling or baking, the meat tends to tenaciously adhere to the lobster exoskeleton.

Several prior art patents have dealth with methods of treating whole lobsters to preserve same after the lobster has been killed. For example, U.S. Pat. 2,501,655 to Altenburg discloses a method comprising heating the surface of the lobster meat adjacent to the shell (by boiling), and subsequently freezing the whole lobster. This method is said to prevent adhesion of the lobster meat to the exoskeleton upon subsequent cooking by the consumer. Also, in U.S. Pat. 3,261,693 to Jung a method is disclosed for preserving lobsters comprising paralyzing the lobster by electric shock, and subsequently freezing the whole lobster. Neither of these methods, however, overcomes all of the prior art problems of flavor, color and texture degradation associated with whole, cooked lobsters upon storage.

It is accordingly a principal object of the present invention to provide an improved method of preparing a whole, cooked and frozen lobster product.

Another object of the present invention is to provide a novel method for eviscerating a whole lobster.

It is a further object of the present invention to provide a novel, two-step method of cooking a whole lobster.

It is an additional object of the present invention to provide an improved method of preparing a whole, cooked lobseter wherein the product may be stored for long periods of time without undesirable flavor and odor development.

It is also an object of the present invention to provide a whole, cooked and frozen lobster product characterized by tender meat which does not unduly adhere to the lobster exoskeleton.

Basically, the present invention contemplates a method of preparing cooked and frozen whole lobsters wherein the internal organs of a whole lobster are first cleaned or removed, and the lobster is subsequently subjected to a two-step cooking sequence. Thereafter, the lobster is packaged and frozen. Further objects and advantages of the present invention will become clear from the following description of the invention taken in conjunction with the drawings, wherein:

FIG. 1 is a top view of a whole lobster.
FIG. 2 is a side view in half section of a whole lobster.

According to the method of this invention, whole live lobsters are selected for processing according to their weight. Although lobsters weighing from about 1–2 pounds are preferred, the method of this invention is applicable to lobsters of any size, and generally may be employed to process lobsters weighing from about ½ pound up to about 5 pounds and more. Although the method of this invention was devised for processing Maine lobsters, it is also applicable to all other varieties, such as spiney lobsters, African lobsters and Bahama lobsters, and to other crustaceans.

It has been discovered that off-flavor and off-odor development in frozen, cooked whole lobsters can be traced directly to degradation of the contents of the internal organs of the lobster, such as the stomach, intestinal tract, and cloaca. Therefore, in order to minimize development of off-odors and off-flavors, the lobsters' internal organs (stomach, intestinal tract and cloaca) are eviscerated or otherwise cleaned. For convenience, the lobster's cloaca and intestinal tract (vein) will be collectively referred to as the hindgut in the description of this invention.

One technique of cleaning out the lobster's internal system is by flushing with a suitable solution. Referring to FIGS. 1 and 2, flushing of a lobster 2 can be carried out by inserting a spray nozzle into the lobster's mouth 3 through mandibles 4. Preferably, sea water or salt water, which is at room temperature or colder, is sprayed through the nozzle under a pressure of from about 5 p.s.i.g. to about 20 p.s.i.g. Water pressures of less than about 5 p.s.i.g. are generally ineffective to flush out the contents of the lobster's internal organs. On the other hand, pressures of greater than about 20 p.s.i.g. tend to cause undesired rupturing of the internal organs. Most lobsters can be flushed out in about 3 to 20 seconds using this technique. However, when the water pressure is within the most preferred range of from about 10 p.s.i.g. to about 15 p.s.i.g., flushing can often be accomplished in as little as from 3–5 seconds. The stomach contents are generally flushed back out through the mouth, thus cleaning out the stomach 6. Moreover, the pressurized water is effective to flush out the undesirable contents of the intestinal track 8 and cloaca 10 through the anus 12. In this manner organic and inorganic debris is eliminated from the gastrointestinal system of the lobster.

A preferred spray nozzle device for carrying out the flushing step would comprise a thin, hollow tube having about a 1/16 inch orifice at the end, and about 4 additional 1/16 inch orifices spaced at 90° intervals about the side walls of the tube, and located about 1/8 to about 1/2 inch from the end of the tube. Most effective flushing is achieved when the spray nozzle is inserted through mouth 3 and mandibles 4, and is thereafter rotated about by hand within the lobster 2.

Although the above-described flushing technique for removing the contents of the lobster's internal organs is effective, the preferred technique for cleaning out the lobster's hindgut involves suction evisceration. This technique comprises making a small slit 14 in the abdomen 16 (lobster tail) in the area of the lobster's cloaca 10. Although this slit may be made on the top or the underside of the lobster, it is preferred to make the slit through the posterior part of the abdominal shell 18 on the top side of lobster 2. A vacuum tube is then inserted through slit 14 and is used to suck out the whole hindgut comprising the intestinal tract 8 (vein) and cloaca 10. Suction evisceration of the hindgut is generally always carried out prior to cooking.

The suction nozzle will generally have an inside diameter of about 1/4 inch in order to effectively remove the hindgut of the lobster. Also, the nozzle will generally be operated under a vacuum of from about 15–25 inches Hg, and removal of the hindgut can generally be accomplished in from about 3–5 seconds.

The stomach 6 of the lobster 2 can subsequently be removed by insertion of the suction nozzle through the mouth 3 between mandibles 4. Suction removal of the stomach and stomach contents generally requires a longer period of time than suction removal of the hindgut, and usually will require from about 5 to 15 seconds.

Because of the longer period of time needed to remove the lobster's stomach 6 and stomach contents by suction, it is preferred to remove the whole stomach by grappling it with a hooked-end rod and pulling it out through the mouth. Thus the stomach 6 can be completely removed by inserting through the lobster's mouth 3 a thin tube or rod having a plurality of hooks formed on the end thereof to engage the stomach lining. Preferably these hooks are formed so as to point slightly outward and back toward the mouth of the lobster. Although it is feasible to remove the lobster's stomach 6 either before or after cooking, it is preferable to remove the stomach prior to cooking.

When cleaning or evisceration of the lobster has been completed, either by flushing, suction evisceration, or grappling, or a combination thereof, the lobster is ready for cooking. The lobster is first placed in boiling water (about 210–212° F.) until an internal temperature of from about 110° F. to about 120° F. is achieved. The water preferably contains up to about 3% salt. This first heating step acts to terminate enzyme action in the liver (tomalley) of the lobster, and also is effective in minimizing future adhesion of the meat to the lobster's exoskeleton.

For most lobsters, this first heating step will require from about 3–12 minutes in boiling water. Thus for a 1½ pound lobster, a first heating step of about 5 minutes in boiling water is sufficient. On the other hand, heating for up to about 10–12 minutes may be required for a 2½ pound lobster. It is important to remember, however, that the necessary criteria to be met in this first heating step is the internal temperature of the lobster. The internal temperature achieved during the heating step should not exceed about 120° F., with a temperature of from about 110° F. to about 115° F. being preferred When the required internal temperature is obtained, the lobster is transferred to a cooking vessel containing water (preferably up to a 3% salt solution) held at from about 180° F. to about 190° F. Again, the internal temperature achieved by the lobster during the cooking step is the important criteria. An internal temperature of greater than about 165° F. is required to heat-denature the proteins. Once an internal temperature of from about 165° F. to about 170° F. is effected, the lobster is removed from the cook vessel. If internal temperatures of greater than about 170° F. are effected, the meat of the final lobster product tends to be tough and dry. On the other hand, if internal temperatures of less than about 165° F. are achieved, there will usually be insufficient denaturization of the lobster meat protein. For most lobsters, a cook period of from about 8 to about 20 minutes is sufficient to achieve the desired internal temperature of about 165° F. It should be clear that the optimum heating time and cook time for any given size lobster can be readily determined by utilizing the described internal temperature guidelines.

Once the two-step cooking sequence has been carried out, the cooked lobsters are removed and are immediately cooled to stop the cooking process and to prevent bacteriological incubation. The cooling step should bring the internal temperature of the lobsters down to within the range of from about 32° F. to about 50° F., and preferably to about 40° F. This chilling step may be accomplished in cold water or cold air as by cooling for 1–2 hours at 40° F., or placing in a freezer for 15–30 minutes.

The lobsters are then placed in individual bags and are frozen, or in the alternative, they may be first frozen and then bagged. Preferably, however, the lobsters are first placed in individual plastic bags or pouches which are moisture impermeable, puncture-resistant, and which have low-temperature flexibility. The bag is then sealed and the product is ready for freezing. If desired, in order to achieve an even greater shelf life, a vacuum may be drawn on the bags and they can be back-filled with a nitrogen atmosphere prior to sealing.

Finally, the cooked whole lobsters are frozen, preferably to an internal temperature of less than 0° F. Placing the lobsters in sub-0° F. freezer for from about 6–12 hours with chilled air circulating through the freezer at an air velocity of about 500 feet per minute would be sufficient. When the lobsters are frozen, they may be packaged in suitable insulated boxes for future storage and shipment.

The cooked and frozen, whole lobster product prepared in accordance with this invention may be kept for up to 6–9 months or longer when stored in a sub-0° F. freezer, without development of off-flavors and off-odors, and without loss of desirable color and pigmentation. Moreover, the lobster meat is tender and juicy, and may be easily removed from the exoskeleton without shredding. To prepare the frozen product, the consumer need merely reheat the product as by broiling or placing in boiling water.

Obviously, many modifications and variations of the invention as hereinbefore set forth may be made without departing from the spirit and scope thereof, and therefore only such limitations should be imposed as are indicated in the appended claims.

We claim:
1. A method for preparing frozen and cooked, whole lobsters comprising: cleaning out the stomach and hindgut of a whole lobster, placing the cleaned lobster in boiling water for from about 3 to about 12 minutes until an internal temperature of from about 110° F. to about 120° F. is achieved, removing the lobster from said boiling water and cooking the lobster in hot water until an internal temperature of greater than about 165° F. is achieved, chilling the lobster to an internal temperature of from about 32° F. to about 50° F., and thereafter freezing the cooked, whole lobster.

2. The method of claim 1 wherein the stomach and hindgut of the lobster is cleaned out by flushing with water under a pressure of from about 5–20 p.s.i.g.

3. The method of claim 2 wherein the water is introduced into the lobster under a pressure of from about 10 p.s.i.g. to about 15 p.s.i.g.

4. The method of claim 1 wherein the stomach and hindgut of the lobster is cleaned out by applying a vacuum to suck out the hindgut and stomach of said lobster.

5. The method of claim 1 wherein the hindgut of said lobster is cleaned out by applying a vacuum thereto, and wherein the stomach of said lobster is pulled out through the mouth of said lobster.

6. The method of claim 1 wherein after removal from said boiling water the lobster is cooked in hot water until an internal temperature of from about 165° F. to about 170° F. is achieved.

7. The method of claim 6 wherein said hot cook water is held at a temperature of from about 180° F. to about 190° F.

8. The method of claim 7 wherein the hindgut of said lobster is suction eviscerated by applying a vacuum thereto through a slit made in the posterior portion of the abdomen of said lobster.

9. The method of claim 8 wherein the stomach of said lobster is grappled with a hook and pulled out through the mouth of said lobster.

References Cited

UNITED STATES PATENTS

| | | | |
|---|---|---|---|
| 2,501,655 | 3/1950 | Alteburg | 99—195 |
| 1,906,375 | 5/1933 | Orande | 99—158 |

RAYMOND N. JONES, Primary Examiner

ROBERT M. ELLIOTT, Assistant Examiner

U.S. Cl. X.R.

99—175